Re. 24756

May 15, 1956 V. D. SCHURR 2,746,016

HIGHLY STABLE ELECTRONIC AMPLIFIER

Filed Dec. 21, 1951 3 Sheets-Sheet 1

INVENTOR
Vernon Dale Schurr.
BY
ATTORNEYS.

INVENTOR
Vernon Dale Schurr.
BY
[signature]
ATTORNEYS.

May 15, 1956 V. D. SCHURR 2,746,016

HIGHLY STABLE ELECTRONIC AMPLIFIER

Filed Dec. 21, 1951 3 Sheets-Sheet 3

INVENTOR
Vernon Dale Schurr.
BY
ATTORNEYS.

United States Patent Office 2,746,016

Patented May 15, 1956

2,746,016

HIGHLY STABLE ELECTRONIC AMPLIFIER

Vernon Dale Schurr, Linfield, Pa., assignor of one-half to Paul Glenn, Pottstown, Pa.

Application December 21, 1951, Serial No. 262,694

4 Claims. (Cl. 324—123)

Figure 1:
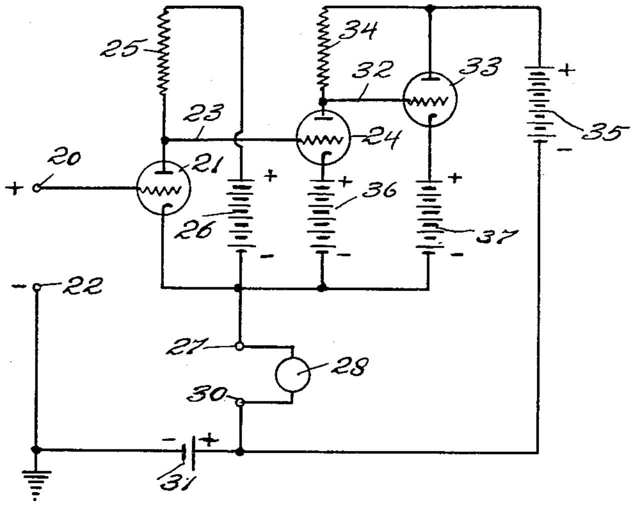

The present invention relates to highly stable electronic amplifiers, especially instrument amplifiers.

A purpose of the invention is to create a direct coupled highly stable electronic amplifier, especially an instrument amplifier, suited for a voltmeter, ammeter, ohmmeter or electronic computer.

A further purpose is to obtain a large input voltage range with infinite input impedance throughout the voltage range with negligible input current.

A further purpose is to hold the voltage from plate to cathode, the plate current, and the voltage from grid to cathode of the input vacuum tube means constant with change in the input voltage.

A further purpose is to avoid input voltage dividers.

A further purpose is to obtain automatic adjustment of bucking voltage.

A further purpose, as the positive voltage on the control grid of the input vacuum tube increases, is to make the voltages of the cathodes of the input and amplifier vacuum tubes increase, securing a regenerative action from a separate vacuum tube to the cathode of the amplifier vacuum tube which causes the amplifier vacuum tube to have infinite gain and applying the same regenerative action to the cathode of the input vacuum tube, thence to the control grid of the amplifier vacuum tube which likewise again influences the amplifier vacuum tube.

A further purpose is to produce a combined effect of positive and negative feedback which causes the cathode and anode of the input vacuum tube to rise in voltage an amount equal to the increase in input voltage so that the potentials and currents in the input vacuum tube remain the same as when the input voltage is zero.

A further purpose is to employ an input vacuum tube, an amplifier vacuum tube and means to produce positive and negative feedback from the amplifier vacuum tube to the input and amplifier vacuum tubes to maintain the potentials and currents in the input vacuum tube the same when the input voltage changes, to couple from the anode of the input vacuum tube to the control grid of the amplifier vacuum tube, to connect from the anode of the amplifier vacuum tube to a feedback vacuum tube and suitably to the control grid of the feedback vacuum tube, to connect from the output of the feedback vacuum tube to the cathodes of the input and amplifier vacuum tubes and to provide a bucking voltage to the anode of the feedback vacuum tube.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved. The drawings are diagrams of circuits useful in explaining the invention.

The present invention is concerned with a direct current or alternating current amplifier which is suitable as a directly coupled highly stable amplifier useful in any amplifier application, but particularly intended for instrumentation as in the operation of voltmeters, ammeters, ohmmeters and for electronic computers and control devices. The device of the invention has the distinctive feature that the amplifier has a very large input voltage range and infinite input impedance throughout the input voltage range. This means effectively that the amplifier will operate over a wide input voltage range with very high input impedance. In conventional amplifiers input impedance changes throughout the input voltage range.

By the invention it is possible to measure simple differences in voltage at high voltage levels with the same accuracy that you would measure small differences in voltage at low voltage levels. Thus, for example, the device of the invention will measure the difference between 100 volts and 100.01 volts with the same accuracy that it will measure the difference between 0.01 volt and 0.02 volt.

The invention is also applicable in sensitive control circuits, since the device has a minimum effect on the measuring circuit itself, eliminating expensive potentiometers or resistance networks.

In the prior art the so called slideback voltmeter has been used, which is adjusted to provide the same conditions in the input tube with a finite input voltage as when the input voltage is zero. This device, however, requires tedious adjustment, and does not automatically adjust to maintain constant conditions in the input vacuum tube.

The cathode follower of the prior art provides simplicity, low output impedance, fair linearity and high input impedance, but it cannot accommodate a large input range unless a high voltage from plate to cathode is provided where the input voltage is zero. This high voltage from plate to cathode together with the relatively high plate current will not allow the input vacuum tube to operate throughout its range with minimum grid current. As the input voltage is increased the voltage from grid to cathode decreases in spite of the name "cathode follower."

Feedback amplifiers which incorporate negative feedback are stable and have an output impedance even lower than the cathode follower. However, these devices like the cathode follower require that the voltage from plate to cathode must be several times the maximum input voltage, leading to the difficulty mentioned with the cathode follower of the prior art. The 100 percent negative feedback amplifiers with high amplification have a constant plate current of the input tube, but the voltage from plate to cathode and from grid to cathode changes with the input voltage and therefore does not assure minimum grid current.

In accordance with the present invention there is automatic maintenance of constant conditions of voltage and current in the input vacuum tube so that the operation of the input tube does not change as the input voltage changes.

In accordance with the invention, a bucking voltage is automatically adjusted. As the positive voltage on the control grid of the input tube increases, the voltages of the cathodes of the input and amplifier vacuum tubes increase. Regenerative action takes place from a feedback tube effectively to the control grid of the amplifier tube which causes the amplifier tube to have infinite gain. This effect is applied to the cathodes of the input tube and the amplifier tube, and the input tube amplifies the effect and returns it to the control grid of the amplifier vacuum tube in the proper phase to maintain stability.

Thus there is combined effect of positive and negative feedback which causes the cathode and anode of the input vacuum tube to increase in voltage by an amount equal to the increase in input voltage. Thus the potentials and currents in the input tube remain the same as when the input voltage was zero. The device therefore behaves as an infinite input impedance device throughout the working range of input voltage. The voltage from plate to cathode and from grid to cathode and the plate current of the input tube remain constant with change in input voltage.

The amplifier of the invention may be used effectively on either alternating or direct current.

In accordance with the invention, I have succeeded in producing an amplifier which has an input range of −100 to +150 volts with very high input impedance and especially low grid current over the full range. This is accomplished using ordinary receiving vaccum tubes and non-precision resistors. For a higher range of input, the supply voltages can be increased, and for a higher input impedance an electrometer tube may be used for the input tube.

Since a large plate to cathode voltage is ordinarily necessary for a large input range and a low plate to cathode voltage is required for a minimum current from grid to cathode, it would be very desirable to have a low plate to cathode voltage and hold it constant as the input voltage changes. If a positive feedback amplifier were connected to the input tube with the amplifier connected to the output terminal it would act as a positive feedback amplifier with more than the critical amount of positive feedback, and as such would have two stable states limited by the supply voltage and ground. This condition would be prevented by the input vacuum tube since any change in the output voltage would be amplified by the input vacuum tube and applied to the amplifier in the same direction as the output voltage, thus locking the input vacuum tube and the amplifier into a stable state and giving the amplifier an infinite gain. Under this condition the input voltage can change without the plate to cathode voltage of the input vacuum tube changing, since the plate to cathode voltage can only be changed by altering the design of the amplifier.

While this would be an improvement over the prior art, the grid to cathode voltage of the input vacuum tube still changes with the input voltage although to a lesser degree. In this case the grid to cathode voltage becomes more negative with the increase of input voltage due to the positive feedback of the amplifier. If now the plate current is held constant in addition to the voltage from plate to cathode, the voltage from grid to cathode will not change with any change of the input voltage. This is accomplished by coupling the anode of the input vacuum tube through a source of voltage to the output terminal. Under this condition the input voltage can change without limit, without changing the voltage from plate to cathode, the plate current or the voltage from grid to cathode of the input vacuum tube. Once these three parameters are fixed for minimum grid current the grid current will remain constant over any range of input voltage within the design of the amplifier.

In Figure 1 the input voltage is applied at terminal 20 (positive if the input is direct current) to the control grid of input vacuum tube 21, having an anode, a cathode and a control grid. The opposite side of the input (the negative in the case of direct current) is connected to grounded terminal 22.

A signal from the anode of input vacuum tube 21 is carried by lead 23 to the control grid of amplifier vacuum tube 24 having an anode, a cathode and a control grid. The anode of input vacuum tube 21 is also connected through plate resistor 25 to the positive side of direct current B source 26, the negative side of which is connected to the cathode of the input vacuum tube 21 and to output terminal 27 to which voltmeter, ammeter, ohmmeter or other instrument 28 is connected. The opposite side of the instrument 28 is connected to terminal 30 which is connected to the positive side of direct current grid bias source 31, the negative side of which is grounded.

Amplifier vacuum tube 24 has its anode connected by lead 32 to the control grid of cathode follower vacuum tube 33 having an anode, a cathode and a control grid. The anode amplifier vacuum tube 24 also connects through a load resistor 34 with the anode of cathode follower vacuum tube 33 and also with the positive side of a source of bucking direct current voltage 35, the negative side of which is connected with the terminal 30 of the instrument 28 and with the positive side of grid biasing source 31, the negative side of which is grounded. The cathode of amplifier tube 24 is connected to the positive side of the direct current grid bias source 36, the negative side of which is connected to instrument terminal 27. The cathode of cathode follower vacuum tube 33 is connected to the positive side of direct current grid bias source 37, the negative side of which is connected to the instrument terminal 27.

It will be evident that in the circuit of Figure 1 there is an input vacuum tube, an amplifier vacuum tube and means to couple the output of the amplifier back to the amplifier tube and the input vacuum tube. The anode of the input vacuum tube is directly connected to the control grid of the amplifier vacuum tube. The anode of the amplifier vacuum tube is also connected to the means for coupling back from the amplifier to the amplifier and input vacuum tubes. In this case the connection is made to the control grid of vacuum tube 33. The means for coupling back is connected to the cathodes of the input and amplifier vacuum tubes, in this case through the instrument 28, and the source of bucking voltage which is connected at the positive side to the anode of vacuum tube 33.

In operation a signal is taken from the anode of input vacuum tube 21 and applied to the control grid of amplifier vacuum tube 24 which has its anode connected to the control grid of cathode follower vacuum tube 33. As voltage is applied to input terminal 20 and to the control grid of input vacuum tube 21 there is automatic adjustment of the bucking voltage supplied by source 35.

If one assumes that the positive input voltage at terminal 20 increases, the effect is to lower the anode voltage on input vacuum tube 21, which is applied to the control grid of amplifier vacuum tube 24, and this raises the anode voltage of amplifier vacuum tube 24 which increases the current flowing from cathode to plate in cathode follower vacuum tube 33, which increases the voltage across the voltmeter or other instrument 28, which raises the voltages of the cathodes of input vacuum tube 21 and amplifier vacuum tube 24. When this action takes place there is a regenerative action from cathode follower vacuum tube 33 applied effectively to the control grid of amplifier vacuum tube 24, which causes the amplifier to have infinite gain. This last result is achieved by the signal applied to the cathode of amplifier vacuum tube 24 and of input vacuum tube 21, which is effectively the same as making the grid of input vacuum tube 21 more negative and therefore this effect is amplified in input vacuum tube 21 and applied to the control grid of amplifier vacuum tube 24. This cancels out the tendency to regenerate in the effect on amplifier vacuum tube 24. The combined actions of the positive and negative feedback thus produced cause the cathode and anode of input vacuum tube 21 to raise an amount equal to the increase in the input voltage. Thus the potentials and currents in input vacuum tube 21 are now the same as when the input voltage equaled zero. Thus the rise in the input voltage can be measured by the instrument 28 or any other similar relation can be measured without drawing any appreciable current from the circuit connected to input terminals 20 and 22.

The device of Figure 1 has the advantage of being readily portable since it is battery operated.

Figure 2:
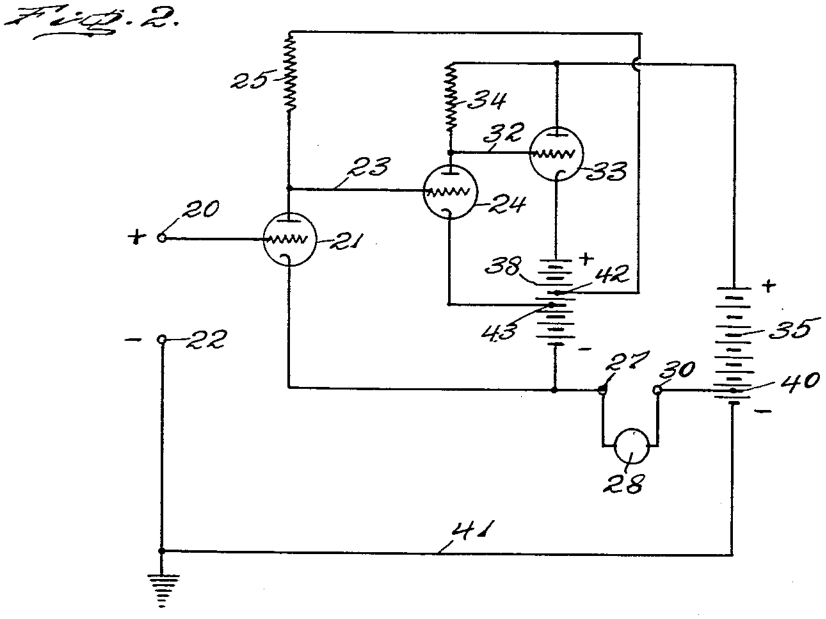

The mechanism of Figure 2 differs from that of Figure 1 in that a central grid bias battery has been provided which also supplies the B battery voltage for the input vacuum tube. In this form the central direct current battery source 38 is connected at its positive side to the cathode of cathode follower vacuum tube 33 and at its negative side to output terminal 27 connected to the instrument 28 and also to the cathode of input vacuum tube 21. The opposite output terminal 30 in this case is connected to an intermediate tap 40 close to the negative side of the bucking voltage source 35. The negative side of the bucking voltage source 35 is suitably connected to ground by connection 41.

The common biasing battery 38 has two intermediate taps, the first of which, 42, nearer the positive terminal, is connected through plate load resistor 25 to the anode of input vacuum tube 21. The second tap 43, closer to the negative terminal of source 38, is connected to the cathode of amplifier tube 24.

Figure 3:
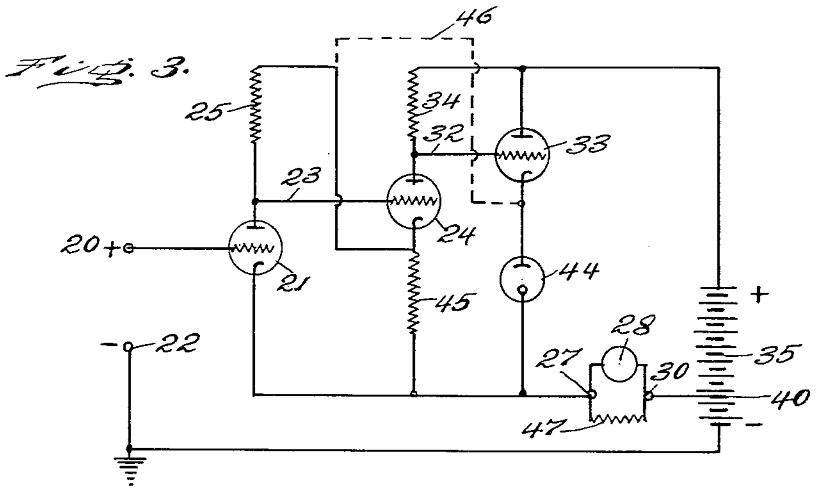

The circuit of Figure 3 is a variation which has eliminated the grid biasing source 38 and employs a gas-filled tube 44 suitably of type VR90 interposed between the cathode of cathode follower vacuum tube 33 and output terminal 27, with the anode of the gas-filled tube connected to the cathode of cathode follower 33 and the cathode of the gas-filled tube connected to the cathode of input tube 21, through bias resistor 45 to amplifier tube 24, and to voltage source 35 through meter 28. The gas-filled tube 44 provides the bias or dropping voltage for the cathode follower vacuum tube 33 and the means for the back connection of cathode follower 33. Bias for amplifier vacuum tube 24 is provided by resistor 45 interposed between the cathode of the amplifier vacuum tube 24 and output terminal 27, to which the cathode of input vacuum tube 21 is directly connected. Resistor 45 can also provide the supply voltage for input vacuum tube 21. The bias for the input vacuum tube 21 is provided by the comparatively low voltage tap 40 across the source of bucking voltage 35.

The anode of input vacuum tube 21 is connected through plate load resistor 25 to the cathode of amplifier vacuum tube 24. There is also a phantom connection 46 shown from the anode of input vacuum tube 21 through plate load resistor 25 to the cathode of cathode follower tube 46 to indicate that the connection 46 is optional for use where more plate voltage is required for the particular tube used at 21. Phantom connection 46 will be used without the connection from load resistor 25 to the cathode of amplifier vacuum tube 24.

A resistor 47 is shown shunting the output terminals 27 and 30 to provide conductivity in case the meter 28 is removed. There is no need for the shunt 47 while the meter is in place.

The amplifier vacuum tube 24 is desirably chosen so that the grid bias is sufficient to raise its cathode high enough to supply the B voltage for the input vacuum tube as shown.

Figure 4:
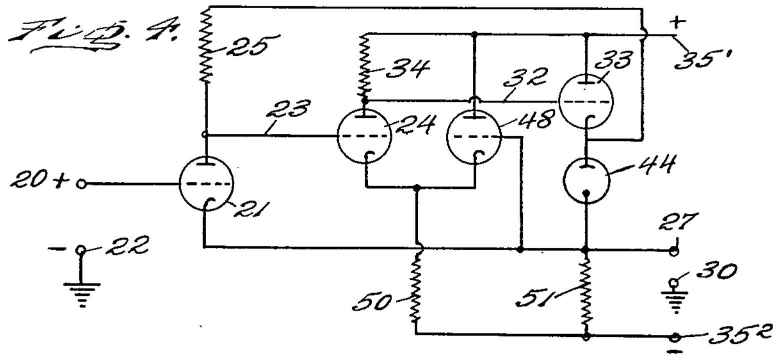

Figure 4 shows a circuit according to the invention resembling Figure 3, but using an external supply for the direct current bucking voltage having the positive side connected at 35′ and the negative side at 35². This form is also unusual in providing for measurement of input voltages below ground (negative). In this form a second cathode follower vacuum tube 48 having an anode, a cathode and a control grid has been introduced. This effectively drives the amplifier vacuum tube 24. In this case the anode of input vacuum tube 21 is connected to the cathode of first cathode follower vacuum tube 33 through plate load resistor 25. Besides the connection 32 from the anode of amplifier vacuum tube 24 to the control grid of first cathode follower vacuum tube 33, the anode of amplifier vacuum tube 24 is connected through plate load resistor 34 to the anode of first cathode follower vacuum tube 33, to the anode of second cathode follower vacuum tube 48 and to the positive side of the bucking source at 35′. The negative side of the bucking source at 35² is connected through a common bias resistor 50 to the cathodes of the amplifier vacuum tube 24 and the second cathode follower vacuum tube 48. The control grid of the second cathode follower vacuum tube 48 is connected to the cathode of input vacuum tube 21, to gas tube 44, and to output terminal 27. The opposite output terminal 30 is grounded. In this case to provide conductivity a resistor 51 is placed across between output terminal 27 and the negative side of the bucking source 35².

The common bias resistor 50 terminates at the negative side of the bucking source and the amplifier tube 24 is driven by the back connection from first cathode follower vacuum tube 33 through gas tube 44 and second cathode follower 48. Since the driving of a tube from the cathode loads the circuit, by interposing second cathode follower vacuum tube 48 in the circuit, difficulty is prevented through loading of the feedback circuit by the connection of amplifier vacuum tube 24. Thus the cathodes of the amplifier vacuum tube and the second cathode follower vacuum tube can be connected together and through a common dropping resistor 50 to the negative side of the bucking source.

Figure 5:
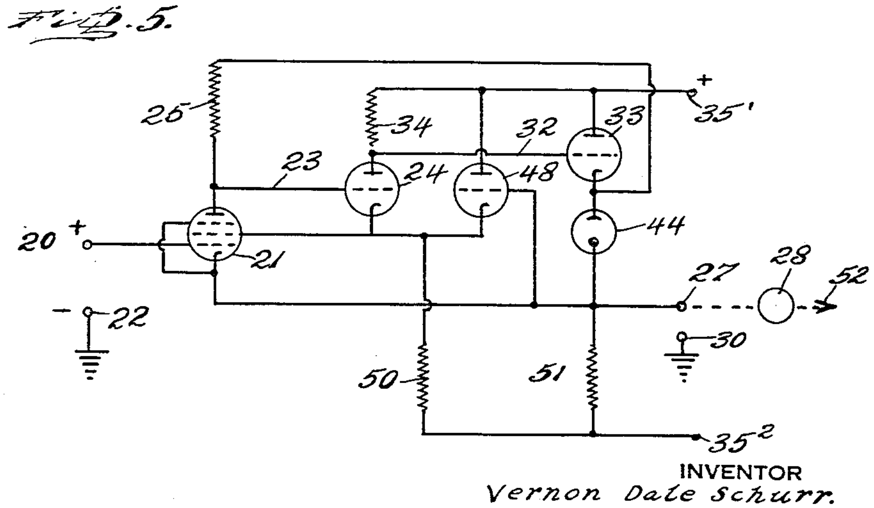

Figure 5 shows a circuit embodying principles of the circuits previously discussed, employing a pentode as the input tube with the usual connection of the suppressor to the cathode. This may be of tube type 6J7. The amplifier tube will desirably be one-half of a tube of type 6SL7. The first and second cathode follower tubes will desirably each be one-half of tube type 6SN7, and the gas tube will be of type VR150. In many respects this circuit of Figure 5 resembles that of Figure 4 but with the additional feature that the screen grid of input tube 21 is connected to the cathode of amplifier vacuum tube 24 and the cathode of second cathode follower vacuum tube 48. A top cap type of input tube is desirable because the top cap construction reduces the leakage from the control grid to the other elements. An electrometer tube would be even more suitable. The combinations of the amplifier vacuum tube 24 and the second cathode follower tube 48 were chosen to hold the voltage from plate to cathode in the input vacuum tube at about 22 volts.

Instead of connecting the instrument between output terminals 27 and 30 in this case, two identical amplifiers as in Figure 5 are connected in push-pull relationship to opposite sides of voltmeter 28, the arrow 52 indicating connection to a similar circuit at its output terminal 27 on the opposite side of the voltmeter. This eliminates the need for a bucking voltage for the voltmeter, balances out drift caused by the changes in filament voltage and makes it possible to measure small differential voltages at high mean levels. With supply voltages of +450 and −150, inputs from minus 100 to +150 volts may be measured without change in grid current. Differential voltages of 0.1 volt or less at a level of 150 volts may be measured with the same accuracy as at ground level. The grid current can be less than $10^{-13}$ amperes with ordinary tubes.

The types and dimensions of the components in Figure 5 by way of example are desirably as follows:

| | |
|---|---|
| Tube 21 | 6J7GT. |
| Tube 24 | ½ 6SL7. |
| Tubes 33 and 48 | each ½ 6SN7. |
| Tube 44 | VR150. |
| Resistor 25 | 5 megohms. |
| Resistor 34 | 1 megohm. |
| Resistor 50 | 200,000 ohms. |
| Resistor 51 | 50,000 ohms. |

Figure 6:
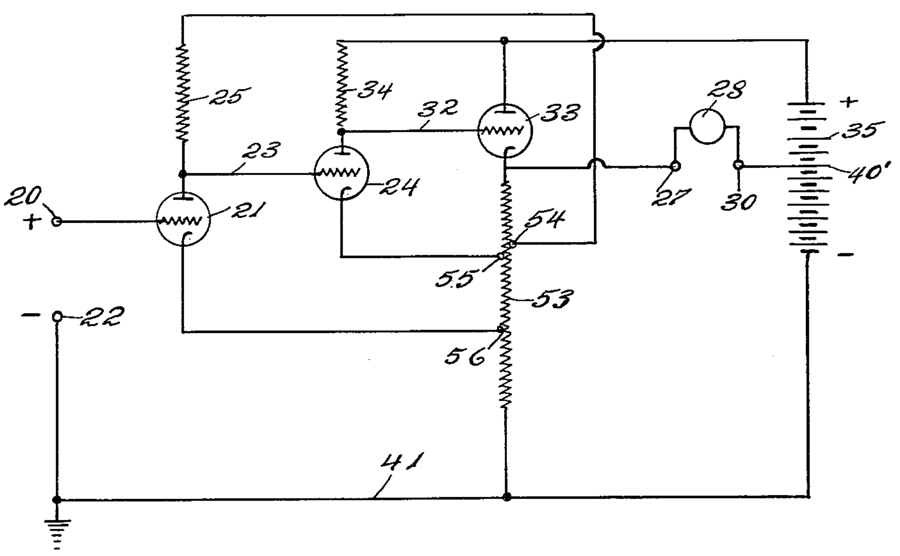

In Figure 6 I show a circuit which provides a gain of more than unity whereas the other circuits provide for a unity gain. In this case a resistor 53 replaces the gas tube 44 placed between the cathode of the first cathode follower vacuum tube and ground. The cathode of cathode follower 33 is connected to one side of the resistor 53 and the other side of the resistor is connected to ground. The resistor has intermediate taps, tap 54 nearest to the cathode of the cathode follower vacuum tube 33 being connected through plate load resistor 25 to the anode of input vacuum tube 21, tap 55 more remote from the cathode of cathode follower of vacuum tube 33 being connected to the cathode of amplifier tube 24, and tap 56 still more remote from the cathode of cathode follower vacuum tube 33 being connected to the cathode of input vacuum tube 21. Output terminal 27 is connected to the cathode of cathode follower vacuum tube 33 and the instrument 28 is connected between output terminal 27 and output terminal 30 which is connected at an intermediate tap 40' on bucking voltage source 35.

As cathode follower vacuum tube 33 draws current it develops a voltage across resistor 53 which supplies the bias for the input tube, the amplifier and the cathode follower vacuum tube and the B voltage for the input vacuum tube via the connection to the anode of the input vacuum tube through plate load resistor 25. The output terminal 27 is connected at a point on resistor 53 which is near the connection to the cathode of cathode follower vacuum tube 33 or preferably actually to the cathode as shown, thus giving greater than unity gain.

It will be evident that the grid current of the input vacuum tube can be made zero by setting the bias of the input vacuum tube to a level at which the positive ion current (the negative grid current) becomes as great as the positive grid current, making the net current zero. This is about −1 to −1.8 volts for oxide coated unipotential cathodes at temperatures of 1,000 to 1,100° K. This is the floating grid potential which the grid assumes if disconnected.

By a combination of positive and negative feedbacks the potentials between the grid and cathode, and between the anode and cathode and the current drawn from anode to cathode and grid to cathode do not change appreciably with a large change of the input voltage to the input tube. The input signal may be many times as large as the voltage from anode to cathode or the supply voltage for the input tube without using input voltage dividers.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. In an amplifier drawing minimal input current for a large range of input voltage, input vacuum tube means having an anode, cathode and control grid, amplifier vacuum tube means, having an anode, cathode and control grid, cathode follower vacuum tube means having an anode, cathode and control grid, an input vacuum tube load resistor, an amplifier vacuum tube load resistor, input vacuum tube biasing means, amplifier vacuum tube biasing means, cathode follower vacuum tube biasing means, a source of B voltage, means for supplying voltage to the anode of the input vacuum tube means, an output load device, means connecting the control grid of the input vacuum tube means to one side of the input, means connecting the anode of the input vacuum tube means to one side of the input vacuum tube load resistor, means connecting the other side of the input vacuum tube load resistor through the means for supplying voltage to the anode of the input vacuum tube to a point responsive to the variable potential of the cathode of the input vacuum tube means which follows the potential of the input signal, such point being free from ground connection, means connecting the anode of the input vacuum tube means to the control grid of the amplifier vacuum tube means, means connecting the cathode of the amplifier vacuum tube means through the amplifier vacuum tube biasing means to the point responsive to the variable potential of the cathode of the input vacuum tube means, means connecting the anode of the amplifier vacuum tube means to the control grid of the cathode follower vacuum tube means, means connecting the anode of the amplifier vacuum tube means through the amplifier vacuum tube load resistor to the positive side of the B source, means connecting the negative side of the B source through the output load device to the point responsive to the variable potential of the cathode of the input vacuum tube means, means connecting the cathode of the cathode follower vacuum tube through the cathode follower tube biasing means to the point responsive to the variable potential of the cathode of the input vacuum tube, means connecting the anode of the cathode follower vacuum tube means to the positive side of the B source and means connecting the side of the output load device which is remote from the cathode through the source of bias for the input vacuum tube means to the other side of the input.

2. An amplifier device comprising a pair of amplifiers each conforming with claim 1.

3. An amplifier according to claim 1, in which the output load device comprises an electrical measuring instrument.

4. An amplifier according to claim 1, wherein said cathode follower vacuum tube biasing means comprises a gas filled tube interposed between the cathode of the cathode follower vacuum tube means and the point responsive to the variable potential of the cathode of the input vacuum tube.

References Cited in the file of this patent

UNITED STATES PATENTS 2,435,579 Francis ---------------- Feb. 10, 1948